No. 889,276.  
PATENTED JUNE 2, 1908.

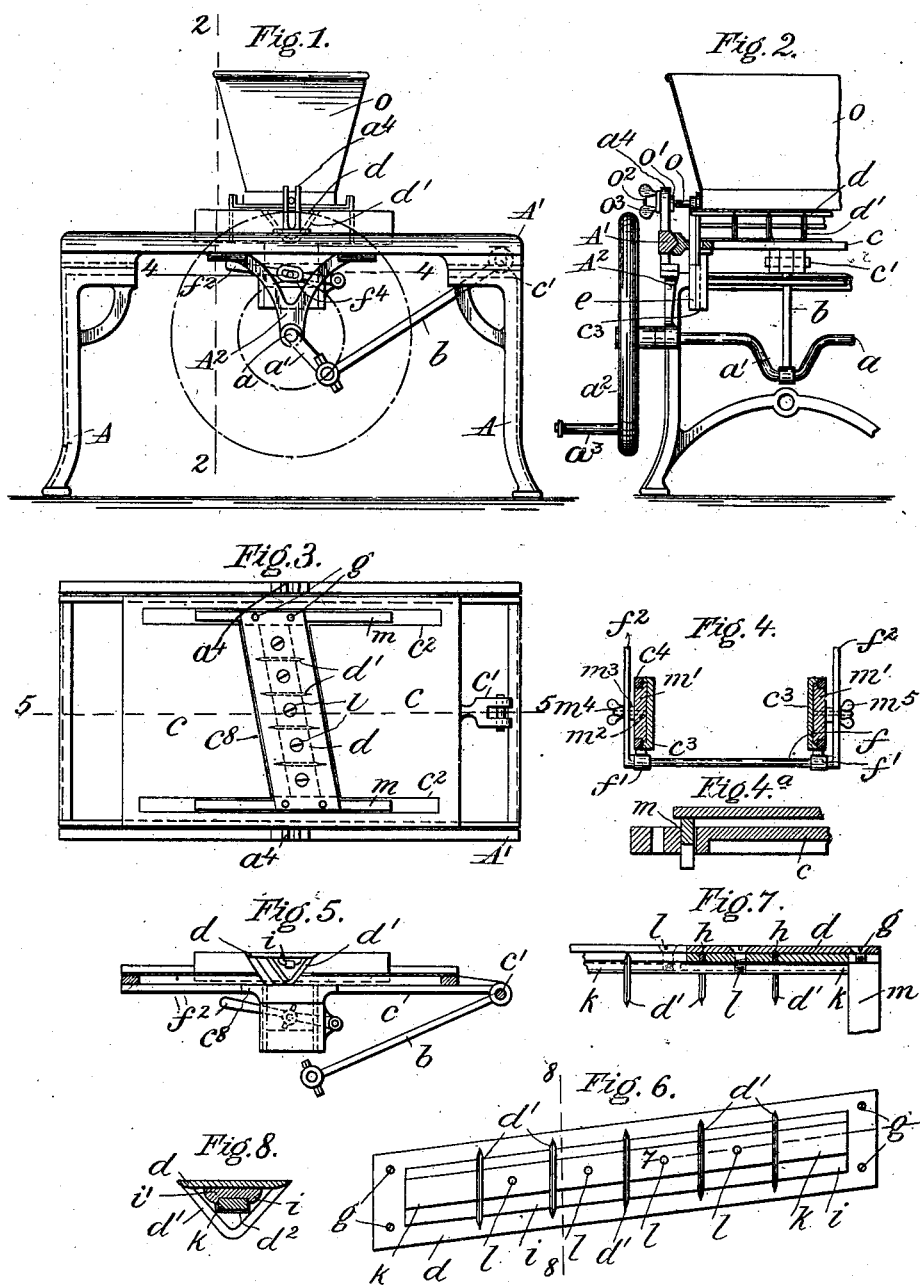

G. VAHLE.  
MACHINE FOR CUTTING VEGETABLES.  
APPLICATION FILED MAR. 5, 1906.

2 SHEETS—SHEET 2.

Witnesses:  
C. H. Crawford  
Ira J. Morgenthal

Inventor:  
Gottlieb Vahle,  
By B. Singer  
Atty.

UNITED STATES PATENT OFFICE.

GOTTLIEB VAHLE, OF BIELEFELD, GERMANY, ASSIGNOR OF ONE-HALF TO HEINRICH GRABE, OF BIELEFELD, GERMANY.

MACHINE FOR CUTTING VEGETABLES.

No. 889,276.     Specification of Letters Patent.     Patented June 2, 1908.

Application filed March 5, 1906. Serial No. 304,372.

*To all whom it may concern:*

Be it known that I, GOTTLIEB VAHLE, of Bielefeld, in the German Empire, locksmith, have invented a Machine for Cutting Vegetables, and do hereby declare the nature of this invention and in what manner the same is to be performed to be particularly described and ascertained in and by the following statement.

This invention relates to improvements in vegetable cutters of that class comprising a stationary hopper and a movable or movable knives and consists in associating the knives and hopper in such a manner that the former, during the cutting operation, coöperate with the delivery end of the hopper to slice or disintegrate the contents thereof.

The invention will be more fully described in connection with the accompanying drawings and will be more particularly pointed out and ascertained in and by the appended claims.

Figure 9:
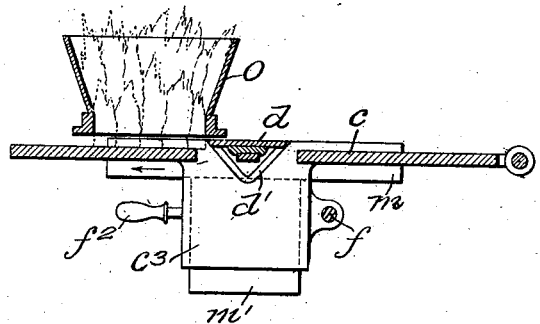
Figure 10:
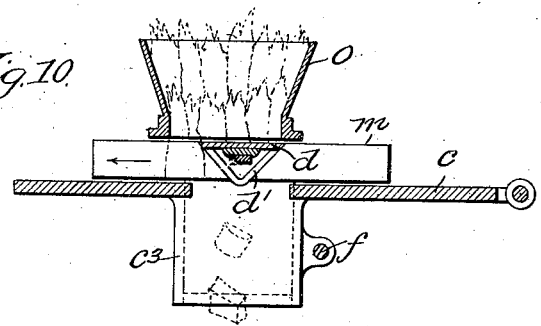
Figure 11:
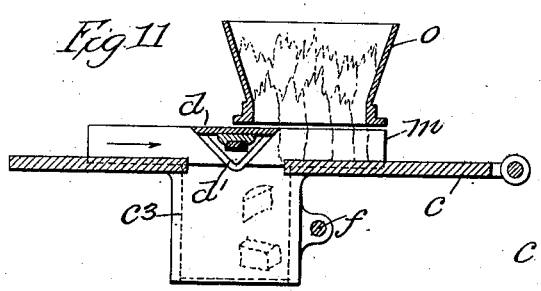
Figure 12:
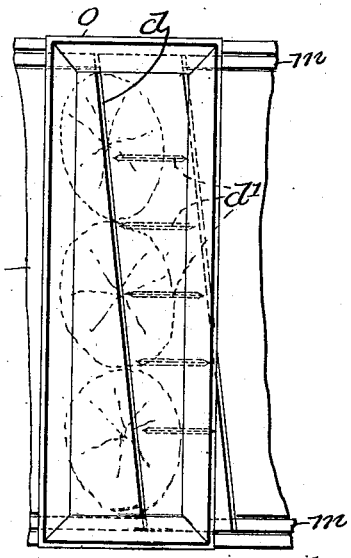

In the drawings Figure 1 is a view in side elevation of a machine embodying the main features of my invention. Fig. 2 is a sectional view on line 2—2 of Fig. 1. Fig. 3 is a plan view of the machine with the hopper removed. Fig. 4 is a horizontal detail section on line 4—4 of Fig. 1. Fig. 5 is a sectional view on line 5—5 of Fig. 3. Fig. 6 is a bottom plan view of the cutting knives. Fig. 7 is a sectional view on line 7—7 of Fig. 6. Fig. 8 is a sectional view on line 8—8 of Fig. 6. Fig. 9 shows the operation of the machine and the adjustment thereof for cutting the vegetables in thin slices, said view being a central vertical section of the machine. Fig. 10 is a similar view showing an adjustment for cutting the vegetables in relatively large pieces and simultaneously slicing such pieces. Fig. 11 is a similar view showing a slightly different adjustment of parts. Fig. 12 is a plan view of the parts shown in Fig. 9.

Like characters of reference designate similar parts throughout the different figures of the drawings.

As shown the device comprises a frame A provided with guide ways A' desirably disposed in parallel relation and extending throughout the length of the frame. A slide or table $c$ is mounted on said ways A', as clearly shown in Figs. 2 and 3, and means are provided for reciprocating said table and as shown said means comprise the following parts. Hangers $A^2$ project downwardly from the frame A, to which they are secured and carry a shaft $a$ to which power is applied for operating the table $c$. Said shaft $a$ is provided with a crank portion $a'$ to which is secured at one end a pitman $b$ which is connected at its other end to the table at $c'$.

$a^2$ designates a balance wheel mounted on the shaft $a$ and provided with a handle $a^3$ adapted for use when the machine is manually driven.

It will be obvious from the foregoing that as the shaft $a$ is rotated the table $c$ will be reciprocated upon the ways of the supporting frame.

I will next describe the arrangement of the knives and the means for supporting the same upon the table $c$.

When a single knife is used the same may consist of a single blade $d$ desirably provided with oppositely disposed cutting edges as shown in Fig. 5. Said knife $d$ is preferably mounted upon a knife support which is adjustable and which may consist of the following parts.

Knife rails $m$, preferably disposed in parallel relation are mounted upon rail supports $m'$. Said rails preferably project through slots $c^2$ in the table $c$ and are adjustable therein with respect to the table. Said rail supports are conveniently mounted to slide in guides $c^3$ depending from the table $c$. Said guides are provided with removable front portions $c^4$ which permit removal of one of the rail supports without removing the other although this feature is not essential to the operation of the invention. Means are provided for adjusting said supports in said guides and as shown said means consists of an adjusting shaft $f$ conveniently mounted in bearings $f'$ secured to the guides $c^3$. Adjusting levers $f^2$ are mounted on said shaft and are provided with slots $f^4$. Studs $m^2$ projecting outwardly from the rail support $m'$ are provided with shoulders $m^3$ and threaded extensions $m^4$, which latter project through the slots $f^4$ of the levers $f^2$. Thumb nuts $m^5$, having threaded connection with said extensions serve to clamp the levers $f^2$ tightly against the shoulders $m^3$. It will be obvious from the foregoing that when the nuts $m^5$ are loosened and the levers $f^2$ are raised or lowered the knife rails $m$ will be correspondingly adjusted to the desired position whereupon it may be locked in such adjusted position by tightening the nuts $m^5$.

According to my invention angularly disposed knives may be employed for slicing and stripping, or in other words cutting the vegetables into strips, and in the preferred construction a single horizontally disposed knife is provided in connection with a plurality of vertically disposed knives. I will now describe in detail the manner in which said knives are mounted. Said knife $d$ as shown is secured to the rails $m$ by screws $g$ and is desirably disposed at an angle with respect to said rails so that it will operate with a draw cut as clearly shown in Fig. 3. The vertically disposed knives $d'$ are preferably in the form of an equilateral triangle and the lower apex is desirably rounded and, together with the lateral portions, is provided with a knife edge. Spacing pieces $i$ are interposed between said knives $d'$ to maintain the same in parallel relation and a proper distance from each other, said spacing pieces being preferably secured to the knife $d$. As shown the securing means consists of a retaining strip $k$ which passes through apertures $d^2$ in the knives $d'$ and is secured by screws $l$ to the knife $d$. Said retaining strip $k$ seats in a recess $i'$ formed in the spacing pieces $i$ and the screws $l$ pass through said spacing pieces. It will thus be seen that means are provided for rigidly securing the vertically disposed knives to the horizontally disposed knife in a manner to hold the former in properly spaced positions with respect to the latter. The cuttings may pass through a delivery opening $c^3$, formed in the table $c$, to any suitable receiver, not shown.

A hopper O or equivalent means is provided for receiving the vegetables or material to be subdivided and delivering the same toward the knives. Means are provided for adjusting the hopper with respect to the knives and table $c$ and to this end the hopper is mounted upon the frame A in the following manner. Slotted members $a^4$ are rigidly secured to the frame A. Shanks $o$ projecting laterally from the hopper O are provided with shoulders $o'$ adapted to engage the inner faces of the slotted member 4. Said shanks are provided with extensions $o^2$, preferably threaded, which project through the slotted members $a^4$ and carry on their outer ends thumb nuts $o^3$. It will be readily seen from the foregoing that when the thumb nuts $o^3$ are loosened the hopper O may be adjusted to any desired position and that said hopper may be locked in its adjusted position by tightening said nuts.

The operation is as follows. Assuming that it is desired to subdivide the contents of the hopper into relatively thin slices the hopper and the knives will be adjusted to the position shown in Fig. 9 wherein the bottom of the hopper and the upper surface of the knife $d$ are in relatively close proximity to the table $c$. When the vegetables are delivered to the hopper their lower portions will rest upon the table $c$ and as the latter, with the knives, is reciprocated the knife $d$, which operates in a horizontal plane, will sever relatively thin slices from the lower ends of the vegetables. The hopper will serve to hold the vegetables while the knife $d$ is cutting the same. After the knife $d$ with the table has traveled to an extreme left position corresponding to the extreme right position shown in Fig. 9 the vegetables will descend in the hopper until their lower ends engage that portion of the table $c$ at the right of the knives and when the knives are reciprocated to the right a further cutting operation will be effected. The sliced or subdivided portions will descend through the opening in the table located below the knives. If it is desired to merely slice the vegetables or cut the same in one plane the knives $d'$ may be removed from the knife $d$ although in Fig. 9 said knives $d'$ are shown in place. However the operation will be readily understood from the foregoing description that the device of my invention may be used to advantage without the knives $d'$.

If it is desired to subdivide the vegetables into relatively large pieces and also slice the same or in other words subdivide in angular planes an adjustment will be effected similar to that shown in Fig. 10 wherein the hopper and the knives are elevated somewhat from the table $c$ with respect to the adjustment shown in Fig. 9. In this adjustment a greater length of the vegetables is presented to the knives and the latter serve to cut off relatively large pieces. In this adjustment when the knives $d'$ are used the latter follow the cutting operation of the knife $d$ and cut the vegetables into slices. The thickness of the slices may be varied by providing spacing pieces $i$ of different length. When the knife $d$ approaches the extreme limit of its travel and is cutting the last vegetable it will sever the same completely before the knives $d'$ have completed their cutting operation but the partially cut portions will cling to the vertical knives $d'$ and will return therewith to an initial position and upon the next reciprocating movement said partially severed pieces will engage the newly fed vegetables and the latter will form an abutting surface against which the vegetables clinging to the knives $d'$ will strike thereby permitting or effecting completion of the slicing operation. Fig. 12 clearly illustrates the action of the horizontal and vertical knives upon the contents of the hopper.

I claim:—

1. A vegetable cutter comprising in combination, a frame provided with guide-ways, a table slidably mounted on said ways and provided with a delivery opening, longitudinally disposed slots and rail support guides, knife rails disposed in said slots and provided with supports slidably mounted in said guides, means for adjusting said supports in said guides comprising an adjusting shaft, bearings for said shaft secured to said guides, adjusting levers mounted on said shaft and connected with said supports, an independently adjustable hopper delivering to said table, a two-edged knife mounted on said rails, and a plurality of knives projecting downwardly from said two-edged knife.

2. A vegetable cutter comprising in combination, a slidably mounted table, adjustable knife rails disposed adjacent said table, an independently adjustable hopper delivering to said table, a two edged knife mounted on said rails, a plurality of knives projecting downwardly from said two edged knife and provided with openings, spacing pieces interposed between said downwardly projecting knives and provided with recesses, and a retaining strip secured to said two edged knife and passing through said openings in said downwardly projecting knives and seating in the recesses of said spacing pieces.

In witness whereof I have hereunto signed my name this 22nd day of August 1905, in the presence of two subscribing witnesses.

GOTTLIEB VAHLE.

Witnesses:
LEONORE KASCH,
ANNA DIPPEL.